United States Patent
Madany et al.

(10) Patent No.: US 9,201,889 B1
(45) Date of Patent: Dec. 1, 2015

(54) INTEGRATED SEARCH FOR SHARED STORAGE

(71) Applicant: EMC Corporation, Hopkinton, MA (US)

(72) Inventors: Peter W. Madany, Hopkinton, MA (US); Allen B. Hubbe, Milford, MA (US); Navaneeth Ranganna, Sunnyvale, CA (US); Suvidya S. Daftardar, Marlborough, MA (US); Oluwasoga T. Oni, Brighton, MA (US); Daniel S. Collins, Princeton, MA (US); Umer Toor, Hopkinton, MA (US); Edward C. Bueche, Pleasanton, CA (US); Sunita Casula, San Ramon, CA (US); Christopher Stacey, Cristchurch (NZ)

(73) Assignee: EMC Corporation, Hopkinton, MA (US)

( * ) Notice: Subject to any disclaimer, the term of this patent is extended or adjusted under 35 U.S.C. 154(b) by 202 days.

(21) Appl. No.: 13/837,511

(22) Filed: Mar. 15, 2013

(51) Int. Cl.
G06F 17/30 (2006.01)

(52) U.S. Cl.
CPC ............................. G06F 17/30106 (2013.01)

(58) Field of Classification Search
None
See application file for complete search history.

(56) References Cited

U.S. PATENT DOCUMENTS

| | | | |
|---|---|---|---|
| 7,627,613 B1* | 12/2009 | Dulitz | G06F 17/30864 |
| 8,667,056 B1 | 3/2014 | Proulx et al. | |
| 8,949,848 B2 | 2/2015 | Heninger et al. | |
| 2003/0105732 A1 | 6/2003 | Kagalwala et al. | |
| 2004/0078341 A1 | 4/2004 | Steichen | |
| 2004/0199507 A1* | 10/2004 | Tawa, Jr. | 707/7 |
| 2005/0060535 A1 | 3/2005 | Bartas | |
| 2005/0234875 A1* | 10/2005 | Auerbach et al. | 707/3 |
| 2006/0059204 A1* | 3/2006 | Borthakur et al. | 707/200 |
| 2006/0111893 A1* | 5/2006 | Florian et al. | 704/8 |
| 2007/0053363 A1 | 3/2007 | Chen et al. | |
| 2008/0033921 A1* | 2/2008 | Arrouye | G06F 17/30997 |
| 2010/0299306 A1 | 11/2010 | Agetsuma et al. | |
| 2010/0306249 A1* | 12/2010 | Hill | G06F 17/30867 707/769 |
| 2011/0213765 A1 | 9/2011 | Cui et al. | |
| 2011/0225165 A1 | 9/2011 | Burstein | |
| 2011/0276695 A1 | 11/2011 | Maldaner | |
| 2012/0069131 A1* | 3/2012 | Abelow | G06Q 10/067 348/14.01 |
| 2012/0265744 A1* | 10/2012 | Berkowitz | G06F 17/30873 707/705 |
| 2013/0031211 A1 | 1/2013 | Johnson et al. | |
| 2013/0073586 A1 | 3/2013 | Aubry et al. | |

(Continued)

OTHER PUBLICATIONS

Google, "Google Search Appliance Data Sheet," Google Search Appliance 7.0, 2012.

(Continued)

*Primary Examiner* — Wilson Lee
(74) *Attorney, Agent, or Firm* — Van Pelt, Yi & James LLP

(57) ABSTRACT

A method of searching shared files stored on a general purpose shared storage includes receiving a search term in a native search interface of an operating system on a computing device; and performing, on the computing device, a search based on the search term including accessing a search functionality of the general purpose shared storage, wherein the search functionality uses indexes of the shared files stored on the shared storage and updates the indexes of the shared files in response to update events generated from the shared files. In one embodiment, the method performs a federated search based on the search term.

25 Claims, 6 Drawing Sheets

(56) References Cited

U.S. PATENT DOCUMENTS

| | | |
|---|---|---|
| 2013/0136011 A1 | 5/2013 | Tardo et al. |
| 2013/0136127 A1 | 5/2013 | Hill et al. |
| 2013/0268942 A1 | 10/2013 | Duluk et al. |
| 2014/0095505 A1 | 4/2014 | Blachflower et al. |

OTHER PUBLICATIONS

Microsoft, "Federated Search Overview", May 2010, accessed Mar. 19, 2013 at http://msdn.microsoft.com/en-us/library/cc806030(d=printer,v=office.14).aspx.

Author Unkown, "ExaSearch", Mar. 28, 2010, http://en.wikipedia.org/wiki/ExaSearch.

\* cited by examiner

INTEGRATED SEARCH FOR SHARED STORAGE

BACKGROUND OF THE INVENTION

Shared storage systems are gaining popularity as a convenient method for sharing files among multiple users. Network-attached storage (NAS) is one example of a shared storage system. In particular, NAS is file-level computer data storage connected to a computer network providing data access to a heterogeneous group of users. As shared storage systems are gaining popularity as a convenient method for sharing files among multiple users, the ability to effectively search for files that are stored on these shared storage systems becomes an important issue. Conventional file searching methods often require building local indexes on each client device. Building a local index at each client device requires each client device to crawl the shared storage file system. The crawling and indexing operations that are required to support index building at each client device can be a burden on the file system, particularly when many users access the same shared storage. In some cases, a search engine may perform a full crawl and then incremental crawls of a shared file system to generate and maintain a central index. However, any type of crawling is resource intensive and the central index is often not updated fast enough to capture recently added or modified files.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
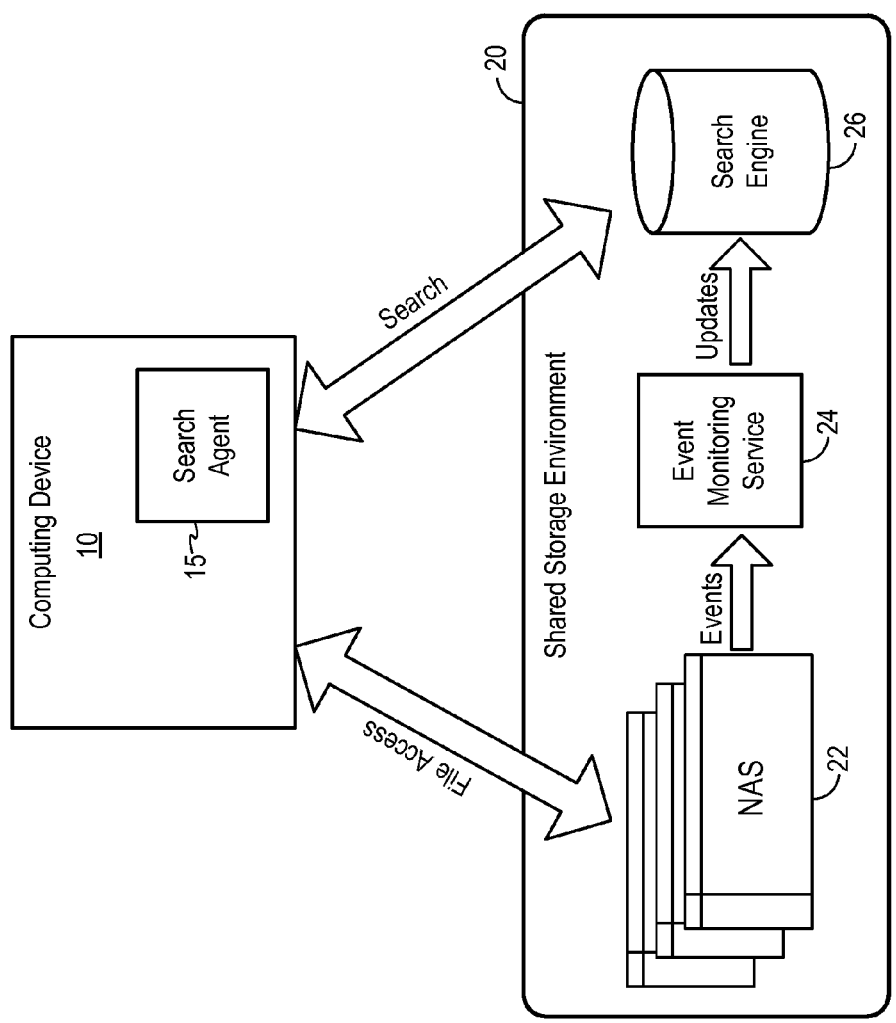
FIG. 1 is a block diagram illustrating an embodiment of a shared data storage incorporating an integrated search functionality for implementing a shared storage search method.

FIG. 1 is a block diagram illustrating an embodiment of a shared data storage incorporating an integrated search functionality for implementing a shared storage search method. In the present example, the shared data storage, or "shared storage," is a network attached storage (NAS) connected to a data network implementing file sharing for multiple users over the data network. In other embodiments, the shared storage can be any data storage system capable of being accessed by multiple users. The use of an NAS in the present example is illustrative only and is not intended to be limiting. Furthermore, it is instructive to note that the "shared storage" described herein refers to a "general purpose shared storage," that is, a shared storage without the use of a content management system. The usual features of a content management system, such as version control, indexing and searching, are thus not available to the user of a general purpose shared storage.

Referring to FIG. 1, a shared storage environment 20 for storing shared files accessible to multiple users includes a file-level shared data storage 22. Shared storage 22 is a NAS in the present example and is connected to a data network (not shown). A user, using a computing device 10, may access the shared files stored on NAS 22 over the data network. In embodiments of the present invention, a search engine 26 is deployed in the shared storage environment 20 to implement an integrated search functionality for the shared storage 22. In one embodiment, the search engine 26 is a software component of the shared storage environment 20. The search engine 26 realizes a centralized search functionality to enable users of the shared storage to search for files on the shared storage without having to establish individual indexes. To that end, the search engine 26 stores and maintains search indexes of the shared files stored on NAS 22. Furthermore, the search engine 26 updates the search indexes incrementally in response to file system events in a manner that ensures the search indexes are up-to-date, as will be explained in more detail below. In one embodiment, the centralized search indexes of the search engine 26 are stored using a block storage of a shared storage system that also contains the NAS 22.

The search engine 26 enables efficient utilization of resources as the file system only needs to be indexed once to build a centralized search index accessible by multiple users. Furthermore, the use of the centralized index eliminates the need for repeated crawling of the shared storage 22, as is often done when each individual user must maintain and update the local indexes one or more times a day. Also, the use of incremental updates eliminates the need for any repeated crawling the shared storage 22 to update the search indexes.

In embodiments of the present invention, the shared storage environment 20 further includes an event monitoring service 24. The event monitoring service 24 observes the file systems in NAS 22 and passes events to the search engine 26, which invokes incremental indexing services as files are created, modified and deleted in the shared storage 22. In some embodiments, the event monitoring service 24 processes a stream of update events, also referred to as the "event stream," received from the NAS 22 and provides a processed event stream to the search engine 26 for indexing. The event stream contains update events such as file updates (file modification and creation) and file deletes. The search engine indexes the files referenced in the update events of the event stream. In this manner, the search engine 26 updates its search indexes incrementally so that the search indexes contain up-to-date file information. As a result, the integrated search functionality in the shared storage environment 20 enables searching of new or modified files within seconds of the files being created or modified.

In some embodiments, the event monitoring service 24 processes the event stream by filtering and coalescing update events received from NAS 22. In some embodiments, the event monitoring service 24 may remove update events that do not need to be processed by the search engine. In other embodiments, the event monitoring service 24 performs de-duplication to remove duplicate update entries. For instance, as event notifications come in from NAS 22 and before the search engine 26 has time to perform the update to the search indexes, the event monitoring service 24 may remove duplicate update events that are in the queue. The event stream processing functions of the event monitoring service 24 will be described in more detail below with reference to FIG. 2.

To access the integrated search functionality in the shared storage environment 20, a thin client-side search agent 15 is installed in the computing device 10. The computing device 10 can be a desktop computer, a laptop computer, a tablet computer, a handheld computing device, a smart phone or other mobile computing devices. A salient feature of the shared storage search method of the present invention is that the search agent 15 enables file searching using the native user interface of the operating system on the computing device 10. In some embodiments, the search agent 15 interfaces with a search function provided by the operating system of the computing device 10, such as through an application programming interface (API). In one embodiment, the search agent 15 interfaces with a federated search function of the operating system of the computing device 10, such as through an API.

The search agent 15 obtains the search term or query from the native search interface and initiates a file search of the shared storage 22 using the integrated search functionality in the shared storage environment 20. In one embodiment, the search agent 15 provides the search term or query to search engine 26, and search engine 26 responds with search results to the search agent 15. The search agent 15 displays the search results from the shared storage in the native user interface of the operating system of the computing device 10. In this manner, the search agent 15 makes finding and accessing shared files easy and intuitive for the user. The search agent 15 operating in conjunction with the integrated search functionality creates an improved user experience as compared to conventional file searching methods. In the case where the shared storage 22 is a NAS, the communication between the search agent 15 and the search engine 26 is carried out over a data network.

Figure 2:
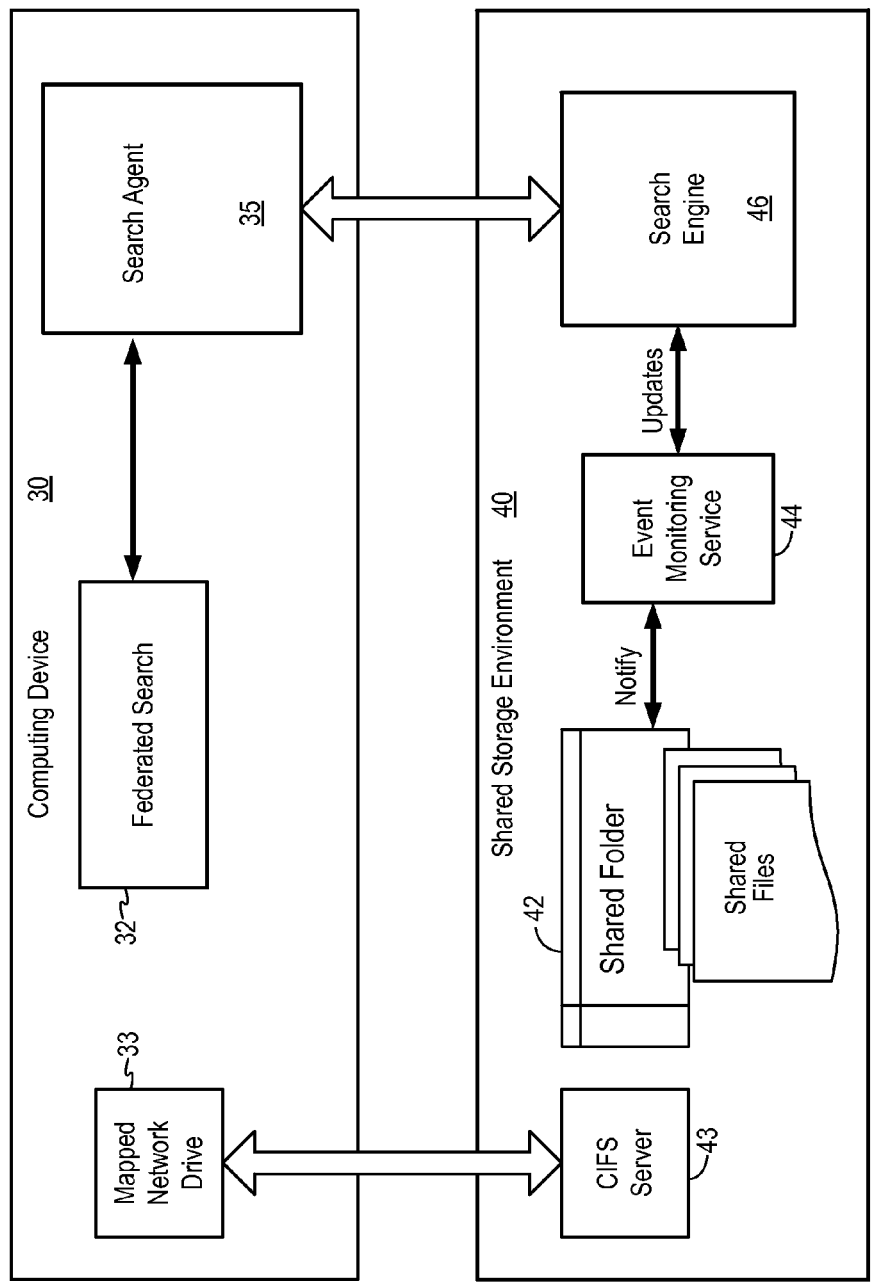
FIG. 2 is a logical block diagram illustrating an alternate embodiment of a shared data storage incorporating an integrated search functionality for implementing a shared storage search method.

FIG. 2 is a logical block diagram illustrating an alternate embodiment of a shared data storage incorporating an integrated search functionality for implementing a shared storage search method. Referring to FIG. 2, a shared storage environment 40 includes a shared storage 42 containing shared folders and shared files. In one embodiment, the shared storage 42 is a network attached storage. The shared storage environment 40 may include a file server 43, such as a CIFS (Common Internet File System) file server, to enable client access to the shared storage 42. In other embodiments, the shared storage environment 40 may implement one or more of various network file sharing protocols, such as NFS, SMB/CIFS, WebDAV, HTTP, FTP, or AFP. The shared storage environment 40 further includes a search engine 46 to implement an integrated search functionality for the shared storage 42. The search engine 46 stores and maintains search indexes of the shared files stored on shared storage 42. The search indexes in the search engine 46 are updated incrementally by update events generated by an event monitoring service 44 to ensure that the search engine has up-to-date search indexes to enable searching of recently modified or recently created files.

In one embodiment, the event monitoring service 44 is a software component that can receive event notifications generated from the shared folder system and can communicate with the search engine using the communication protocol of the search engine. In one embodiment, the search engine 46 is configured to communicate using the HTTP protocol and the event monitoring service 44 is configured to communicate with the search engine 46 using the HTTP protocol. The operation of the event monitoring service 44 to process the update events received from the shared storage 42 and to generate the processed event stream for indexing by the search engine 46 will be described in more detail below.

A computing device 30, when authorized, may access the shared files on the shared storage 42. For example, when the shared storage is a network attached storage, the computing device 30 may access the shared files through a mapped network drive function 33. When the shared storage 42 is a NAS, the communication between the mapped network drive function 33 and the shared storage 42 is carried out over a data network. Other methods for accessing the shared files in the shared storage may be used.

To access the integrated search functionality in the shared storage environment 40, a thin client-side search agent 35 is installed in the computing device 30. In the present embodiment, the search agent 35 interfaces with a federated search function 32 of the operating system of the computing device 30. Accordingly, the shared storage search method operates as part of the federated search of the computing device. In other embodiments, the search agent 35 interfaces with a search function provided by the operating system of the computing device 30. The search agent 35 improves the user experience by enabling a user to enter a search term in the native search interface of the operating system of the computing device and receiving search results in the native user interface of the operating system.

In embodiments of the present invention, the search agent 35 is a software component that functions as a bridge between the federated search function of the computing device and the integrated search functionality (search engine 46) of the shared storage environment 40. In one embodiment, the search agent 35 communicates with the federated search function 32 through an application programming interface (API). Moreover, in one embodiment, the search agent 35 communicates with the federated search function 32 using the OpenSearch protocol. Meanwhile, the search agent 35 also communicates with the search engine 46 on the shared storage environment 40. In one embodiment, the search engine 35 communicates with the search engine 46 over a data network using the HTTP protocol.

In operation, a search term or search arguments or a query is entered into the native search interface of the computing device 30 to be processed by the federated search function 32. The federated search function 32 may carry out a search for the search term in a local storage, which may include a direct attached storage. Meanwhile, the search agent 35 obtains the search term or query and generates a search request in a communication protocol suitable for the search engine 46. The search agent 35 transmits the search request to the search engine 46. After the search engine 46 processes the search request, the search agent 35 then receives search results from the search engine 46 and presents the search results in the native user interface of the computing device 30. In one embodiment, the search results from the search engine are presented as part of the search results of the federated search using the federated search function 32. Furthermore, in one embodiment, the federated search function 32 aggregates the search results from the local storage of the computing device and from the shared storage and presents the search results in the native user interface as a unified listing of search results.

In embodiments of the present invention, the search engine 46 performs searches based on content or metadata and generates relevant search results including files of various file types (e.g., word processing files, spreadsheet files, drawings, photos, videos, and sound files). In one embodiment, the search results are present including the file name, the file path and a link to the file in the respective storage location (local or shared storage). A user of computing device 30 may use the link to direct the computing device to the file at the respective storage location. Importantly, the files identified in the search results of the shared storage can be opened and edited in the same manner as files in the local storage of the computing device.

In embodiments of the present invention, the event monitoring service 44 observes the file systems in the shared storage 42 and passes events to the search engine 46, which invokes incremental indexing services as files are created, modified and deleted in the shared storage 42. An important feature of the integrated search functionality of the present invention is that the event monitoring service 44 receives a stream of file system update events (an event stream) from the shared storage 42 and propagates the events to the search engine 46 for indexing. In other words, the event monitoring service 44 generates a processed event stream to the search engine 46 for updating the centralized search indexes in a manner such that the search indexes has up-to-date file information to enable searches of recently created or modified files. In this manner, the search engine 46 is able to realize low latency indexing. The use of an event stream for search index updates realizes significant improvement over conventional index update methods, such as those using incremental crawling.

In some embodiments, the event monitoring service 44 persists queue contents through interruptions, such as unexpected power cycles. In this manner, the search engine 46 receives the processed event stream to update the search indexes incrementally so that the search indexes contain up-to-date file information.

In some embodiments, the event monitoring service 44 receives notifications of file system events from the shared storage 42. In the present description, "file system events" or "update events" refer to two types of file events: (1) file update which includes file modification and file creation, and (2) file deletion. Since the behavior for file modification and file creation is so similar, they can all be considered modification events. In some embodiments, the event monitoring service 44 receives a stream of update events (an "event stream" or an "event feed") from the shared storage 42 where each update event in the event stream is identified by the event type (modify or delete) and a unique file identification (ID). The file ID may include a combination of: a shared storage network address, a file access protocol ID or a port number, and a file path name.

In one embodiment, the shared storage 42 is configured to continuously send an stream of update events that have occurred at the file system to the event monitoring service 44. The event monitoring service 44 aggregates the notifications of update events and queues the update events for processing by the search engine 46. In one embodiment, the event monitoring service 44 processes the event stream using an event queue to generate a processed event stream for the search engine 46.

In operation, the event monitoring service 44 may receive an event stream with many duplicate events. In the present description, duplicate events refer to update events for the same file with the same unique file identification. For example, the event stream may include incrementally changed files, such as when the same file is being saved multiple times by a user. In embodiments of the present invention, the event monitoring service 44 coalesces update events related to the same file and deletes duplicate update events from the event queue. By performing event filtering, event compression and de-duplication, the event monitoring service 44 is able to reduce the chatter and noise in the processed event stream, and the search index update operation can be performed more efficiently.

In embodiments of the present invention, the event monitoring service uses an event queue for processing the event stream where the event queue implements a First-In-First-Out data structure. In some embodiments, the event queue may be implemented using a linked list. As update events come in from the shared storage 42, the event monitoring service 44 puts the latest event at the end of the event queue. Meanwhile, the search engine 46 retrieves the entry from the front of the event queue for indexing. Accordingly, events are dequeued or removed from the front of the event queue and are queued up at the back of the event queue.

In embodiments of the present invention, the event monitoring service 44 implements two operational modes in processing the event stream and generating the processed event stream. More specifically, the event monitoring service 44 can be operated in a latency-optimized mode or a throughput-optimized mode.

In the latency-optimized mode, when the event monitoring service 44 receives an update event from the shared storage 42, the event monitoring service 44 checks to see if the event queue currently contains an update event with the same unique file ID. If an update event with the same file ID is already in the event queue, then the event monitoring service 44 overwrites the event entry in the queue with the newly received update event. If no update event with the same file ID is present in the event queue, then the event monitoring service 44 puts the newly received update event at the back of the event queue.

In the throughput-optimized mode, when the event monitoring service 44 receives an update event from the shared storage 42, the event monitoring service 44 checks to see if the event queue currently contains an update event with the same unique file ID. If an update event with the same file ID is already in the event queue, then the event monitoring service 44 removes the event entry in the queue and puts the newly received update event at the back of the event queue. If no update event with the same file ID is present in the event queue, then the event monitoring service 44 puts the newly received update event at the back of the event queue.

In one embodiment, the event monitoring service 44 implements an efficient data structure, such as a hash table, for determining whether the event queue already contains an update event with the same unique file identification.

In embodiments of the present invention, a single processed event stream may be generated for several shared storage file systems or several threads of a shared storage file system. In that case, the files of the several shared storage file systems or several threads of a shared storage file system will be indexed by a common set of search indexes.

In some embodiments, a single processed event stream may be shared among two or more search engines. In that case, the search engines collaborate to generate a common set of search indexes.

In some embodiments, a shared storage system may generate several event streams. In that case, the shared storage system ensures that the same file is always assigned to the same event stream.

In some embodiments, the event monitoring service 44 may generate multiple processed event streams using multiple event queues. For example, different processed event streams may be generated for different file types. In some embodiments, different processed event streams are generated and each processed event stream is assigned a priority level. That is, a first processed event stream may contain update events of highest priority while a second processed event stream may contain update events of medium priority. In one embodiment, a first processed event stream is used for files from a batch source while a second processed event stream is used for files from interactive users. Files from interactive users typically have a more aggressive latency requirement. Therefore, the second processed event stream can be assigned a higher priority than the first processed event stream for indexing at the search engine.

As a whole, the shared storage environment 40 provides two services: (1) storage system service to facilitate user access to stored files; and (2) search engine service to facilitate user search of stored files. In operation of the shared storage environment, a certain level of quality of service is desired for the storage system service. However, the search engine operation in indexing file update events and performing queries may result in resource contention in the shared storage environment 40. In embodiments of the present invention, the search engine 46 is configured to react to the work load of the shared storage system and to adjust its indexing and/or query operations in response to ensure a certain level of quality of service is maintained in the shared storage environment 40. In particular, the search engine 46 operates to ensure that the quality of service for the storage system service is not degraded due to the integrated search functionality. In some embodiments, the search engine 46 implements policies to throttle or reduce or back off the indexing service according to processing load at the shared storage. In this manner, indexing latency and throughput, and perhaps query throughput or response time, are traded off against the normal interactions of the storage device.

In embodiments of the present invention, the search engine 46 implements a collection of techniques to achieve the desired quality of service at the shared storage environment. In one embodiment, the quality of service in shared storage environment 40 is ranked as follows: (1) end-user shared storage requests, such as read and write requests, is highest priority; (2) search query response time for end-users is next highest priority; (3) indexing throughput is the next highest priority; (4) indexing latency is the next priority; and (5) quality of search has the lowest priority in terms of quality of service.

In some embodiments, the search engine throttles the indexing operation when needed to maintain the quality of service required for shared storage requests and/or search query response time. In some embodiments, the search engine 46 is configured to perform file filtering to reduce the amount of indexing from the processed event stream. In one embodiment, the search engine 46 filters the processed event stream based on file type. In one example, the search engine 46 is configured to skip indexing of temporary files. In other words, the search engine 46 discards update events associated with temporary files. In the present description, temporary files are created by user's software applications and are normally invisible to the users. Skipping indexing of these temporary files may not degrade the quality of the search that much but may improve the quality of service for other aspects of the shared storage.

In another embodiment, the search engine 46 filters the processed event stream based on the business value of the files. Not all files in a shared storage have the same business value. The business values of the files can be determined from the file location, the file format, the file size and/or the file name. In one example, the search engine 46 examines the meta-data of the files in the processed event stream and applies meta-data filters to selectively delay indexing of files considered to have low business values. In one embodiment, update events associated with files having low business values are detained or held in an event queue and these update events can be indexed at a later time when more resources are available.

In yet another embodiment, the search engine 46 receives multiple processed event streams, each processed event stream having an assigned priority level. The search engine 46 performs indexing of files referenced in the update events based on the priority of the processed event streams. A processed event stream with a higher priority will be indexed more quickly to ensure a certain level of quality of service while a processed event stream with a lower priority may have its indexing delayed to save capacity for other processing load. The update events associated with a low priority event steam may be detained in an event queue pending system resource availability.

Using multiple processed event streams with different priority levels achieves several advantages. First, separating update events by priority levels and giving indexing preference to higher priority event streams ensure lowest latency indexing for files that are more critical or files that have higher business values. Second, separating update events by priority levels reduces the event traffic to be indexed so that the storage and search quality of service can be maintained with minimal hardware.

In yet another embodiment, the search engine 46 identifies frequently indexed files and detains update events associated with these frequently indexed files in anticipation of more update events to arrive from the event queue. As new events for those files arrive, older detained events can be dropped from indexing. Then, after a given time period, the detained event is let through to be indexed.

In some embodiments, the shared storage 42 not only sends events but also quality-of-service feedback to the search engine to trigger further optimization or throttling in the search engine. In one embodiment, the search engine 46 has a given set of preset throttle limits to limit its processing load impact on the shared storage environment 40.

Figure 4:
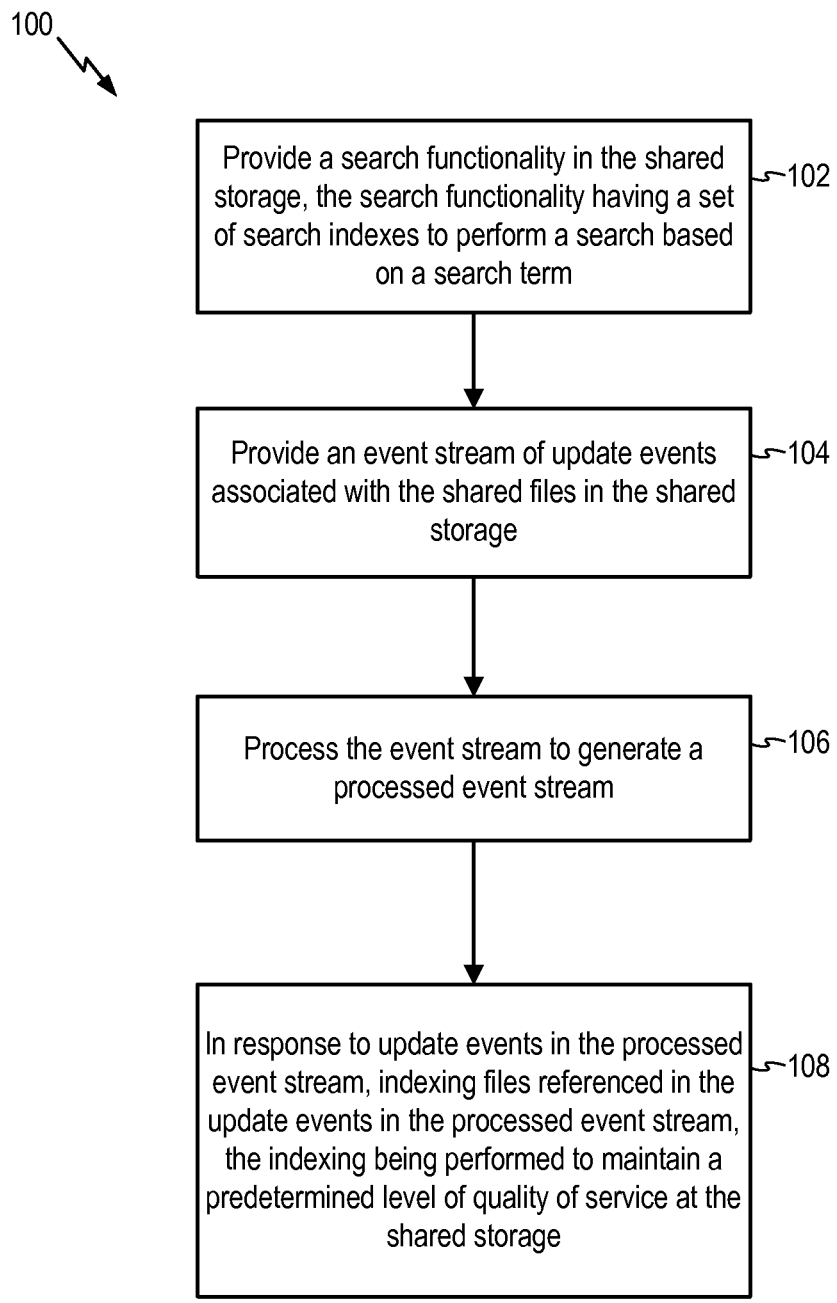
FIG. 4 is a flow chart illustrating a method in a search engine of a shared storage in embodiments of the present invention.

FIG. 4 is a flow chart illustrating a method in a shared storage for implementing an integrated search functionality in embodiments of the present invention. Referring to FIG. 4, at 102, a search functionality in the shared storage is provided where the search functionality has a set of search indexes to perform a search based on a search term. At 104, an event stream of update events associated with the shared files in the shared storage is provided. At 106, the event stream is processed to generate a processed event stream. At 108, in response to update events in the processed event stream, the search functionality indexes files referenced in the update events in the processed event stream where the indexing is performed to maintain a predetermined level of quality of service at the shared storage.

In embodiments of the present invention, the search engine 46 implements secured access of the shared storage and provides search results that include only files to which the user or the computing device has authorized access. In some embodiments, the search engine 46 maintains an access control list. The search engine 46 searches for all results based on the search term. The search engine 46 then reviews the access control list and applies filtering of the search results. The search engine 46 filters the search results based on the access control list so that the computing device is provided with only search results that the computing device or the user has access right to.

Figure 3:
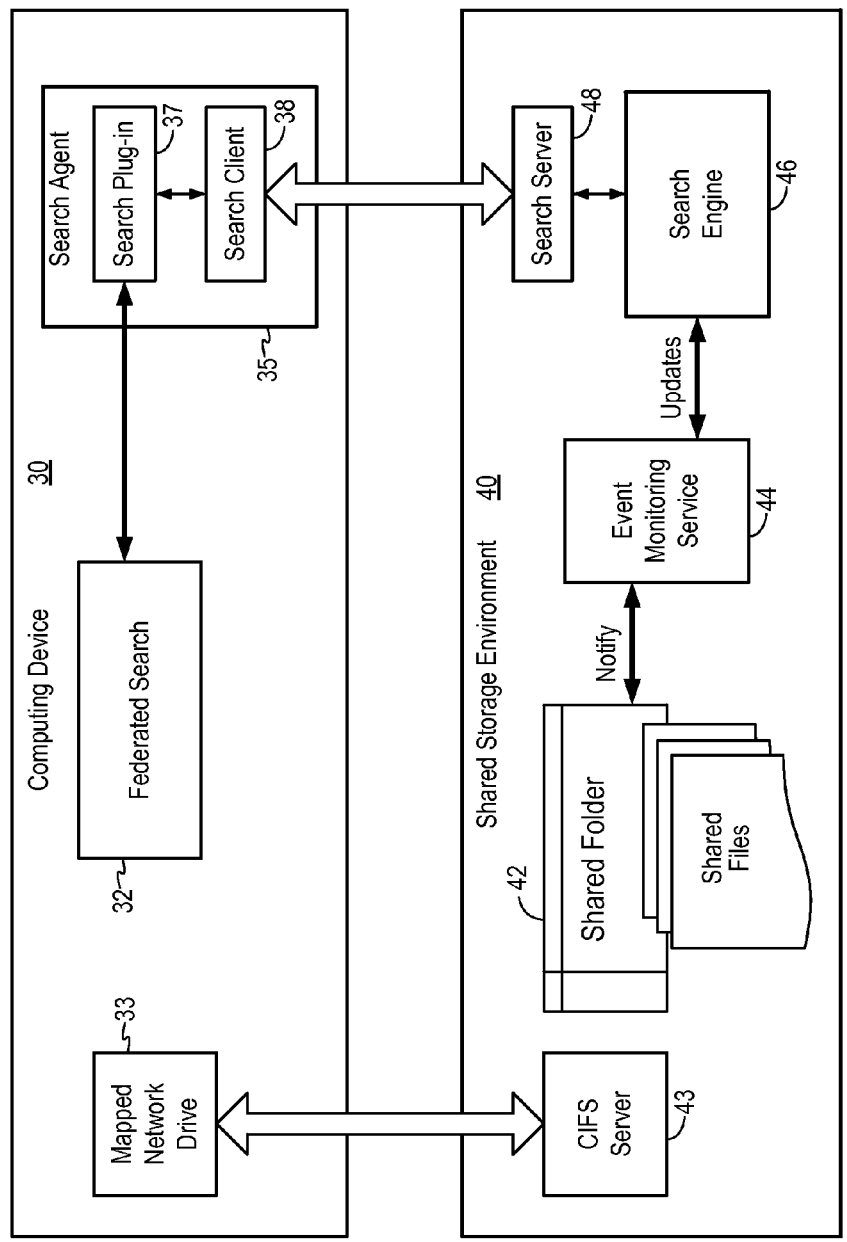
FIG. 3 is a logical block diagram illustrating an alternate embodiment of the search agent that can be installed in a computing device for using the shared storage search method of the present invention.

In embodiments of the present invention, the search agent 35 can be implemented as a single software component or in multiple separate software components. The exact configuration of the search agent 35 is not critical to the practice of the present invention. FIG. 3 is a logical block diagram illustrating an alternate embodiment of the search agent that can be installed in a computing device for using the shared storage search method of the present invention. Like elements in FIG. 3 and FIG. 2 are given like reference numerals and will not be further described. Referring to FIG. 3, in the present embodiment, the search agent 35 includes a search plug-in component 37 and a search client component 38. The search plug-in component 37 implements the interface with the federated search function 32 of the operating system (or other search functions of the operating system). In one embodiment, the search plug-in component 37 interfaces with the federated search function 32 through an application programming interface. The search client component 38 functions as a communication interface to facilitate communication with the search engine 46 as the integrated search functionality in the shared storage environment 40. In one embodiment, the search client component 38 enables communication with the search engine 46 using a network protocol, for example, the HTTP protocol.

In embodiments of the present invention, the search engine 46 is provided with a search server component 48 to support communication with the search agent 35. In one embodiment, the search client component 38 of the search agent and the search server component 48 form a bridge to facilitate the transmission of search requests and the receipt of search results between the computing device 30 and the search engine 46. For instance, the search client component 38 communicates with the search server component 48 using a network protocol, for example, the HTTP protocol. The search server component 48, in turn, communicates with the search engine 46 through an API.

In embodiments of the present invention, the search engine 46 performs searches based on content or metadata and performs full-text searches on multiple file types (e.g., word processing files, spreadsheet files, drawings, photos, videos, and sound files). In other embodiments, the search engine 46 implements cross language searches. The search engine 46 may perform search of a search term using all supported languages. The search engine may generate search results that contain documents in any supported language, as if the query had been issued in the language native to each file. For example, a query with the word "bread" may produce files in Spanish that contain the word "pan." In one embodiment, the search engine uses SKOS (Simple Knowledge Organization System) thesaurus search in the cross language searches.

In one embodiment, the search engine 46 may provide to the federated search function 32 suggestions for narrowing the search criteria that are returned along with the search results. In some embodiments, suggestions for narrowing the criteria are generated based on features of the result set, such as terms and metadata that are common to many elements.

Figure 5:
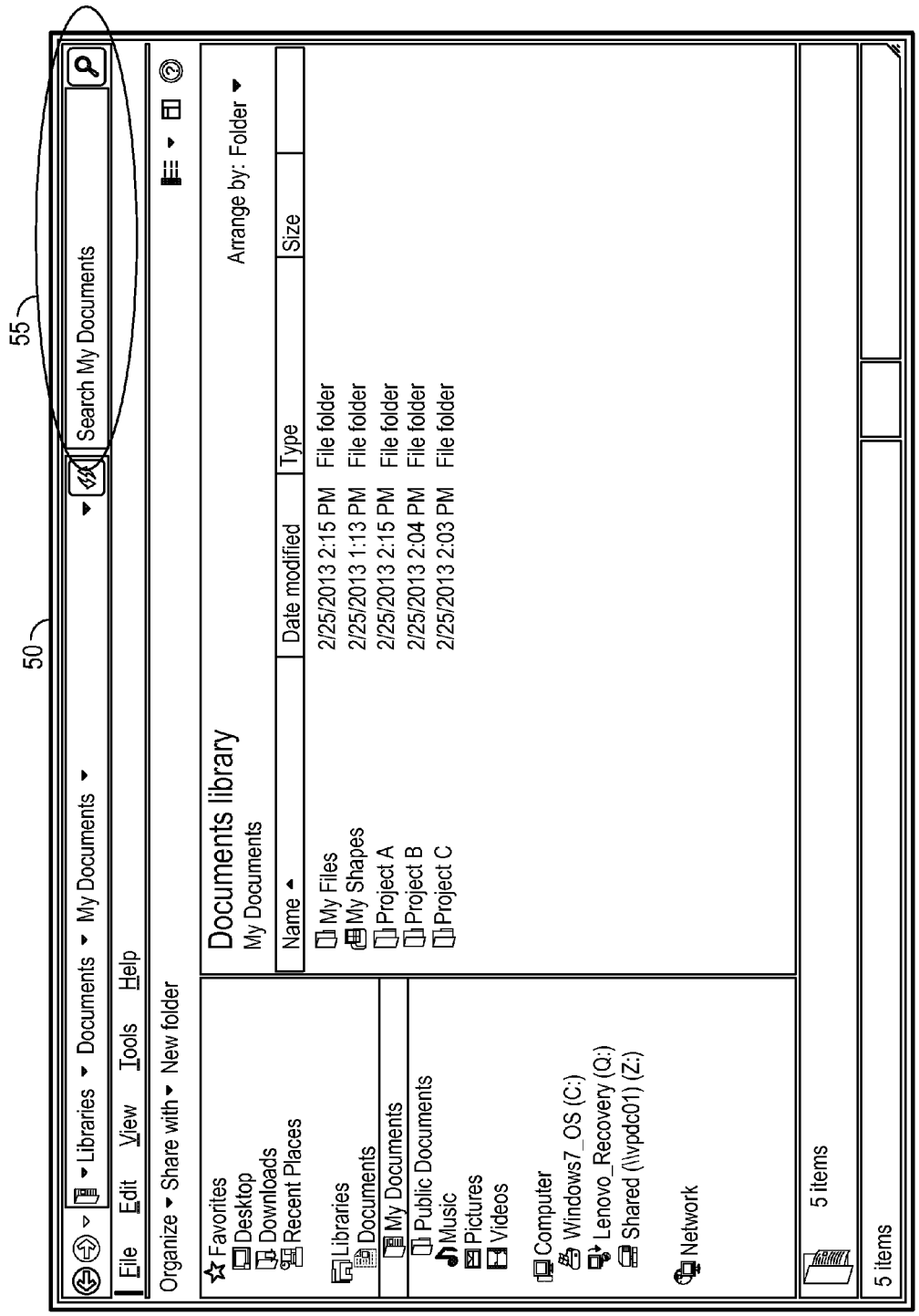
FIG. 5 illustrates an example of a user interface on a computing device running the Windows® 7 operating system for performing federated searches.

FIG. 5 illustrates an example of a user interface on a computing device running the Windows® 7 operating system for performing federated searches, including searching a shared storage using the shared storage search method of the present invention. Referring to FIG. 5, in a native user interface 50 of a Windows® 7 operating system, a native search interface 55 for performing a federated search is presented to the user in a search box. The user may enter a search term or a query in the native search interface to search for files on a local storage and on a shared storage.

Figure 6:
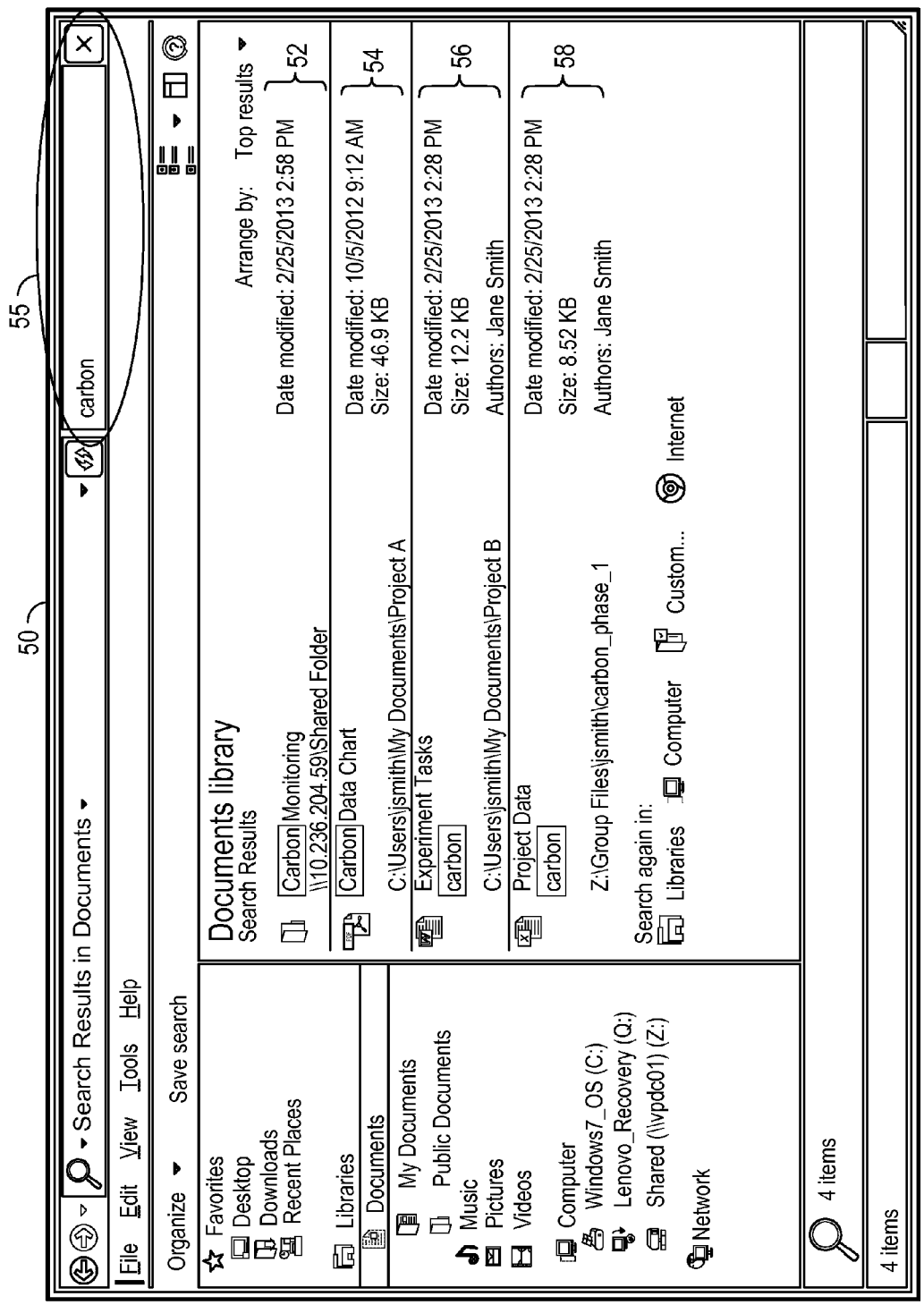
FIG. 6 illustrates an example of a user interface on a computing device running the Windows® 7 operating system for displaying search results.

FIG. 6 illustrates an example of a user interface on a computing device running the Windows® 7 operating system for displaying search results from a federated search, including displaying search results from a shared storage obtained using the shared storage search method of the present invention. Referring to FIG. 6, when a search term (e.g., "carbon") is entered into the search box of the native search interface 55, the search term is provided to the local search functionality to search the local storage. The search term is also provided to the search agent to generate a search request for the search engine 46. Search results from the local storage and from the shared storage are presented in an aggregate form. For example, the search results in response to the search term "carbon" include a file in a shared folder with the word "carbon" in the folder name (item 52). The search results further include a PDF format file with the word "carbon" in the title (item 54). The search results also include a Word file with the word "carbon" in the content of the file (item 56). Finally, the search results further include an Excel spreadsheet file with the word "carbon" in the content (item 58).

By integrating the shared storage search method with the federated search of the computing device, the shared storage search method of the present invention improves user experience and enables the user to perform one search to obtain search results from multiple data sources, including shared storage.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of searching shared files stored on a general purpose shared storage comprising:
  receiving a search term in a native search interface of an operating system on a computing device; and
  performing, on the computing device, a search based on the search term including accessing a search functionality of the general purpose shared storage, wherein the search functionality of the general purpose shared storage uses indexes of the shared files stored on the shared storage and the search functionality updates the indexes of the shared files in response to a processed event stream of update events generated from the shared files, the processed event stream being generated from a stream of update events by performing event filtering, event compression and de-duplication on the stream of update events generated from the shared files of the general purpose shared storage.

2. The method of claim 1, further comprising:
receiving from the search functionality a first set of search results associated with the search term; and
providing a display of the first set of search results on the computing device using a native user interface of the operating system of the computing device.

3. The method of claim 2, wherein receiving from the search functionality a first set of search results associated with the search term comprises:
receiving from the search functionality the first set of search results associated with the search term and for which the computing device has authorized access.

4. The method of claim 1, wherein performing, on the computing device, the search based on the search term further comprises:
performing, on the computing device, a federated search based on the search term including by accessing the search functionality of the shared storage.

5. The method of claim 4, further comprising:
performing the federated search by accessing a local search functionality of the computing device to search a local storage based on the search term.

6. The method of claim 5, further comprising:
receiving from the search functionality a first set of search results associated with the search term;
receiving from the local search functionality a second set of search results associated with the search term; and
providing a display of the first and second sets of search results on the computing device using a native user interface of the operating system of the computing device.

7. The method of claim 6, wherein providing the display of the first and second sets of search results on the computing device using the native user interface of the operating system of the computing device comprises:
providing a listing of files identified in the first and second sets of search results, the listing identifying respective storage locations of each file; and
for each file in the listing, providing a link to direct the computing device to the file at the respective storage location.

8. The method of claim 1, wherein receiving the search term in the native search interface of the operating system on the computing device comprises:
obtaining the search term received at the native search interface through an application programming interface.

9. The method of claim 8, wherein accessing a search functionality of the shared storage comprises:
accessing the search functionality of the shared storage over a data network;
generating a search request including the search term using a network communication protocol of the data network; and
transmitting the search request to the search functionality over the data network.

10. The method of claim 1, wherein the search functionality updates the indexes of the shared files in response to an update event stream that has been filtered to remove duplicate update events.

11. The method of claim 1, wherein performing the search based on the search term including by accessing the search functionality of the shared storage comprises:
performing the search based on the search term by accessing the search functionality of the shared storage, the search functionality performing a cross-language search of the search term.

12. A system for searching shared files stored on a general purpose shared storage comprising:
a processor; and
a memory coupled with the processor, wherein the memory is configured to provide the processor with instructions which when executed cause the processor to:
receive a search term in a native search interface of an operating system on a computing device; and
perform, on the computing device, a search based on the search term including accessing a search functionality of the general purpose shared storage, wherein the search functionality of the general purpose shared storage uses indexes of the shared files stored on the shared storage and the search functionality updates the indexes of the shared files in response to a processed event stream of update events generated from the shared files, the processed event stream being generated from a stream of update events by performing event filtering, event compression and de-duplication on the stream of update events generated from the shared files of the general purpose shared storage.

13. The system recited in claim 12, wherein the memory is further configured to provide the processor with instructions which when executed cause the processor to:
receive from the search functionality a first set of search results associated with the search term; and
provide a display of the first set of search results on the computing device using a native user interface of the operating system of the computing device.

14. The system recited in claim 12, wherein the memory is further configured to provide the processor with instructions which when executed cause the processor to:
receive from the search functionality a first set of search results associated with the search term and for which the computing device has authorized access.

15. The system recited in claim 12, wherein the memory is further configured to provide the processor with instructions which when executed cause the processor to:
perform, on the computing device, a federated search based on the search term including by accessing the search functionality of the shared storage.

16. The system recited in claim 15, wherein the memory is further configured to provide the processor with instructions which when executed cause the processor to:
perform the federated search by accessing a local search functionality of the computing device to search a local storage based on the search term.

17. The system recited in claim 16, wherein the memory is further configured to provide the processor with instructions which when executed cause the processor to:
receive from the search functionality a first set of search results associated with the search term;
receive from the local search functionality a second set of search results associated with the search term; and provide a display of the first and second sets of search results on the computing device using a native user interface of the operating system of the computing device.

18. The system recited in claim 12, wherein the memory is further configured to provide the processor with instructions which when executed cause the processor to:
   obtain the search term received at the native search interface through an application programming interface.

19. The system recited in claim 12, wherein the memory is further configured to provide the processor with instructions which when executed cause the processor to:
   perform, on the computing device, the search based on the search term including by accessing the search functionality of the shared storage, wherein the search functionality is further configured to update the indexes of the shared files in response to an update event stream that has been filtered to remove duplicate update events.

20. The system recited in claim 12, wherein the memory is further configured to provide the processor with instructions which when executed cause the processor to:
   perform the search based on the search term by accessing the search functionality of the shared storage, the search functionality performing a cross-language search of the search term.

21. A computer program product for searching shared files stored on a general purpose shared storage, the computer program product being embodied in a tangible computer readable storage medium and comprising computer instructions for:
   receiving a search term in a native search interface of an operating system on a computing device; and
   performing, on the computing device, a search based on the search term including accessing a search functionality of the general purpose shared storage, wherein the search functionality of the general purpose shared storage uses indexes of the shared files stored on the shared storage and the search functionality updates the indexes of the shared files in response to a processed event stream of update events generated from the shared files, the processed event stream being generated from a stream of update events by performing event filtering, event compression and de-duplication on the stream of update events generated from the shared files of the general purpose shared storage.

22. The computer program product recited in claim 21, further comprising computer instructions for:
   receiving from the search functionality a first set of search results associated with the search term; and
   providing a display of the first set of search results on the computing device using a native user interface of the operating system of the computing device.

23. The computer program product recited in claim 21, further comprising computer instructions for:
   receiving from the search functionality a first set of search results associated with the search term and for which the computing device is authorized to access.

24. The computer program product recited in claim 21, further comprising computer instructions for:
   performing, on the computing device, a federated search based on the search term including by accessing the search functionality of the shared storage.

25. The computer program product recited in claim 21, further comprising computer instructions for:
   obtaining the search term received at the native search interface through an application programming interface.

* * * * *